(12) United States Patent
Ma et al.

(10) Patent No.: US 11,143,786 B2
(45) Date of Patent: Oct. 12, 2021

(54) INTRINSIC GEOLOGICAL FORMATION CARBON TO OXYGEN RATIO MEASUREMENTS

(71) Applicants: Halliburton Energy Services, Inc., Houston, TX (US); Saudi Arabian Oil Company, Dhahran (SA)

(72) Inventors: Shouxiang Mark Ma, Dhahran (SA); Nacer Guergueb, Al-Khobar (SA); Weijun Guo, Houston, TX (US)

(73) Assignees: Halliburton Energy Services, Inc., Houston, TX (US); Saudi Arabian Oil Company, Dehahran (SA)

(*) Notice: Subject to any disclaimer, the term of this patent is extended or adjusted under 35 U.S.C. 154(b) by 135 days.

(21) Appl. No.: 16/466,920

(22) PCT Filed: Jul. 5, 2018

(86) PCT No.: PCT/US2018/040920
§ 371 (c)(1),
(2) Date: Jun. 5, 2019

(87) PCT Pub. No.: WO2020/009701
PCT Pub. Date: Jan. 9, 2020

(65) Prior Publication Data
US 2020/0191993 A1 Jun. 18, 2020

(51) Int. Cl.
*G01V 5/14* (2006.01)
*G01V 5/04* (2006.01)
(Continued)

(52) U.S. Cl.
CPC .............. *G01V 5/145* (2013.01); *G01V 5/045* (2013.01); *G01V 5/102* (2013.01); *G01V 5/12* (2013.01); *E21B 47/085* (2020.05)

(58) Field of Classification Search
CPC ........ G01V 5/145; G01V 5/045; G01V 5/102; G01V 5/12
See application file for complete search history.

(56) References Cited

U.S. PATENT DOCUMENTS 3,780,301 A * 12/1973 Smith, Jr. .............. G01V 5/102
250/301
3,780,302 A   12/1973 Arnold et al.
(Continued)

FOREIGN PATENT DOCUMENTS

WO   2016-205446   12/2016

OTHER PUBLICATIONS

International Search Report and Written Opinion, Application No. PCT/US2018/040920, dated Mar. 21, 2019, 31 pages.
(Continued)

*Primary Examiner* — David P Porta
*Assistant Examiner* — Djura Malevic
(74) *Attorney, Agent, or Firm* — John Wustenberg; Baker Botts L.L.P.

(57) ABSTRACT

The disclosure provides methods of measuring an intrinsic CO ratio in a geological formation by disposing, proximate the formation, a petrophysical tool including at least one gamma-ray detector, reading a carbon gamma-ray peak for the geological formation and an oxygen gamma-ray peak for the geological formation, determining a measured CO ratio of the geological formation from the carbon gamma-ray peak and the oxygen gamma-ray peak, and correcting the measured CO ratio by applying a corrective algorithm specific for the petrophysical tool or the type of petrophysical tool to obtain an intrinsic CO ratio of the geological formation. The corrective algorithm is derived by a mathematical analysis of measured CO ratios of a sample with a known intrinsic CO ratio using the same petrophysical tool
(Continued)

or a petrophysical tool representative of a same type of petrophysical tool. Additional methods and systems using this method are provided.

19 Claims, 8 Drawing Sheets

(51) Int. Cl.
*G01V 5/10* (2006.01)
*G01V 5/12* (2006.01)
*E21B 47/085* (2012.01)

(56) References Cited

U.S. PATENT DOCUMENTS

| | | | | |
|---|---|---|---|---|
| 3,780,303 | A | 12/1973 | Smith et al. | |
| 3,787,686 | A | 1/1974 | Culver | |
| 3,838,279 | A * | 9/1974 | Schultz | G01V 5/102 |
| | | | | 250/269.6 |
| 3,842,265 | A | 10/1974 | Pitts, Jr. | |
| 3,939,343 | A | 2/1976 | Schultz et al. | |
| 3,947,683 | A * | 3/1976 | Schultz | G01V 5/102 |
| | | | | 250/269.6 |
| 4,168,428 | A | 9/1979 | Culver | |
| 4,585,939 | A | 4/1986 | Arnold et al. | |
| 4,937,446 | A * | 6/1990 | McKeon | G01V 5/102 |
| | | | | 250/265 |
| 5,360,975 | A | 11/1994 | Stoller | |
| 5,374,823 | A | 12/1994 | Odom | |
| 5,475,727 | A * | 12/1995 | Buchanan | G01T 1/40 |
| | | | | 378/53 |
| 5,699,246 | A | 12/1997 | Plasek et al. | |
| 5,804,820 | A | 9/1998 | Evans et al. | |
| 6,167,965 | B1 * | 1/2001 | Bearden | E21B 43/385 |
| | | | | 166/250.15 |
| 6,289,283 | B1 * | 9/2001 | Plasek | G01V 5/101 |
| | | | | 702/8 |
| 6,389,367 | B1 * | 5/2002 | Plasek | G01V 5/101 |
| | | | | 250/269.6 |
| 6,403,949 | B1 * | 6/2002 | Davis | G01J 1/18 |
| | | | | 250/227.27 |
| 6,614,229 | B1 * | 9/2003 | Clark | E21B 43/086 |
| | | | | 324/338 |
| 6,863,127 | B2 * | 3/2005 | Clark | G01V 3/30 |
| | | | | 166/250.01 |
| 7,059,428 | B2 * | 6/2006 | Frey | G01V 3/30 |
| | | | | 175/50 |
| 7,297,957 | B1 * | 11/2007 | Vickers | G01T 1/40 |
| | | | | 250/363.09 |
| 7,372,018 | B2 | 5/2008 | Trcka et al. | |
| 7,408,150 | B1 | 8/2008 | Flaum et al. | |
| 8,234,072 | B2 * | 7/2012 | Smith, Jr. | G01V 5/101 |
| | | | | 702/8 |
| 8,265,874 | B2 | 9/2012 | Ma et al. | |
| 8,346,481 | B2 | 1/2013 | Jacobson et al. | |
| 8,903,658 | B2 * | 12/2014 | Marsh | G01V 5/104 |
| | | | | 702/8 |
| 9,207,353 | B2 | 12/2015 | Kwong | |
| 9,863,895 | B1 * | 1/2018 | Ma | E21B 47/005 |
| 9,890,632 | B2 * | 2/2018 | Ma | E21B 47/12 |
| 10,202,833 | B2 * | 2/2019 | Willberg | E21B 43/247 |
| 10,208,582 | B2 * | 2/2019 | Ma | E21B 47/00 |
| 10,247,849 | B2 * | 4/2019 | Pfutzner | G01V 5/102 |
| 2003/0173072 | A1 * | 9/2003 | Vinegar | B09C 1/02 |
| | | | | 166/66.5 |
| 2003/0209347 | A1 * | 11/2003 | Clark | G01V 3/30 |
| | | | | 166/250.01 |
| 2004/0149434 | A1 * | 8/2004 | Frey | E21B 43/086 |
| | | | | 166/250.1 |
| 2005/0067563 | A1 * | 3/2005 | Gilchrist | G01V 5/102 |
| | | | | 250/269.7 |
| 2007/0023626 | A1 * | 2/2007 | Riley | G01V 5/125 |
| | | | | 250/269.6 |
| 2008/0251710 | A1 * | 10/2008 | Riley | G01V 5/101 |
| | | | | 250/269.7 |
| 2008/0265151 | A1 * | 10/2008 | Gadot | G01T 1/40 |
| | | | | 250/261 |
| 2009/0114829 | A1 * | 5/2009 | He | G01V 7/005 |
| | | | | 250/370.01 |
| 2011/0001040 | A1 * | 1/2011 | Smith, Jr. | G01V 5/107 |
| | | | | 250/264 |
| 2011/0012012 | A1 * | 1/2011 | Stein | G01T 1/17 |
| | | | | 250/252.1 |
| 2011/0186721 | A1 * | 8/2011 | Galford | G01V 5/101 |
| | | | | 250/252.1 |
| 2012/0059587 | A1 * | 3/2012 | Marsh | G01V 5/06 |
| | | | | 702/8 |
| 2014/0262249 | A1 * | 9/2014 | Willberg | E21B 43/247 |
| | | | | 166/251.1 |
| 2015/0090871 | A1 * | 4/2015 | Chace | G01V 5/101 |
| | | | | 250/269.7 |
| 2015/0285944 | A1 * | 10/2015 | Herron | G01V 11/00 |
| | | | | 250/269.6 |
| 2015/0369956 | A1 * | 12/2015 | Ma | E21B 47/12 |
| | | | | 250/269.7 |
| 2016/0299236 | A1 * | 10/2016 | Ambrose-Thurman | |
| | | | | G01T 1/2018 |
| 2016/0370494 | A1 * | 12/2016 | Zhou | G01T 1/17 |
| 2017/0322340 | A1 * | 11/2017 | Zhou | G01V 5/101 |
| 2018/0058188 | A1 * | 3/2018 | Ma | G01V 5/102 |
| 2018/0372906 | A1 * | 12/2018 | Hou | G01N 13/00 |
| 2020/0191993 | A1 * | 6/2020 | Ma | G01V 5/045 |

OTHER PUBLICATIONS

Fundamentals of Pulsed Neutron—TDML capture mode versus RMT C/O mode, Halliburton Energy Services, Inc., 10 pages, Aug. 2008.
RMT-3D™ 2⅛-in. Reservoir Monitor Tool for Oil, Water and Gas Saturations, Halliburton Energy Services, Inc., 2 pages, May 2019.
Cased-Hole RMT-3D™ 2⅛-in. Mineralogy an KUTh Spectral Gamma Ray, Halliburton Energy Services, Inc., 2 pages, May 2019.
Reservoir Monitor (RMT™ i) Tool, Halliburton Energy Services, Inc., 4 pages, May 2019.
TMD3D™ (Thermal Multigate Decay—3 Detector) Logging Tool, Halliburton Energy Services, Inc., 2 pages, Jul. 2012.
Pulsed Spectral Gamma (PSG$^{SM}$) Logging Service, Halliburton Energy Services, Inc., 1 page, 2008.
RSTPro-Water saturation, lithology, and porosity through casing, Schlumberger, www.slb.com/oilfield, 8 pages, Jul. 2006.
Raptor™ 2.0 Cased-Hole Evaluation System, Weatherford, 8 pages, 2017.
Reservoir Performance Monitor (RPM), Baker Hughes, 5 pages, Mar. 2018.

* cited by examiner

INTRINSIC GEOLOGICAL FORMATION CARBON TO OXYGEN RATIO MEASUREMENTS

RELATED APPLICATIONS

This application is a U.S. National Stage Application of International Application No. PCT/US2018/040920 filed Jul. 5, 2018, which designates the United States, and is incorporated herein by reference in its entirety.

TECHNICAL FIELD

The present disclosure relates generally to methods of determining the intrinsic carbon to oxygen (CO) ratio of a geological formation.

BACKGROUND

It is useful to know if a geological formation of interest contains a hydrocarbon and the relative amounts of hydrocarbon and water in a geological formation. These relative amounts can be determined from the CO ratio of the geological formation.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

The present disclosure provides a method of determining the intrinsic CO ratio of a geological formation, which may be used to further detect a hydrocarbon in the geological formation or determine the hydrocarbon to water ratio of the geological formation.

The intrinsic CO ratio for a geological formation is the ratio between atomic number density values of carbon and oxygen for the geological formation, including any minerals, water, and hydrocarbon found in the geological formation. A measured CO ratio for the geological formation, i.e. the calculated existing apparent CO ratio, which may differ from the intrinsic CO ratio, is the ratio between carbon and oxygen count rates based on measured gamma-ray peaks.

The method uses a petrophysical tool downhole to determine a carbon gamma-ray peak and an oxygen gamma-ray peak. The carbon gamma-ray peak, at around 4.4 Megaelectron Volts (MeV), and the oxygen gamma-ray peak, at around 6.1 MeV, may not accurately represent the intrinsic carbon amount and the intrinsic oxygen amount of the formation, such that a measured CO ratio determined from the carbon gamma-ray peak and the oxygen gamma-ray peak does not accurately represent the intrinsic CO ratio of the geological formation. Such inaccuracies may result in inefficient identification and extraction of hydrocarbons from geological formations or, in the perforation of a wellbore casing, inappropriate or non-optimal locations or with inappropriate or non-optimal perforation sizes and distributions.

A corrective algorithm, which may be specific for the petrophysical tool or type of petrophysical tool, is applied to correct errors in the measured CO ratio, resulting in the intrinsic CO ratio of the geological formation.

Corrective algorithms disclosed herein are complex, such that they may not be developed by a human within a reasonable time frame or applied by a human within a time frame, such as within 30 minutes or within 2 hours, that is practical while drilling a wellbore or otherwise determining how to extract a hydrocarbon from a geological formation. Accordingly, the corrective algorithms disclosed herein are developed using at least a processor programmed to execute a mathematical analysis and a memory and corrective algorithms are applied using at least a processor programmed to execute at least a portion of the algorithm, and often all of the algorithm. The processor may further work in conjunction with a memory and at least one output device.

Figure 1:
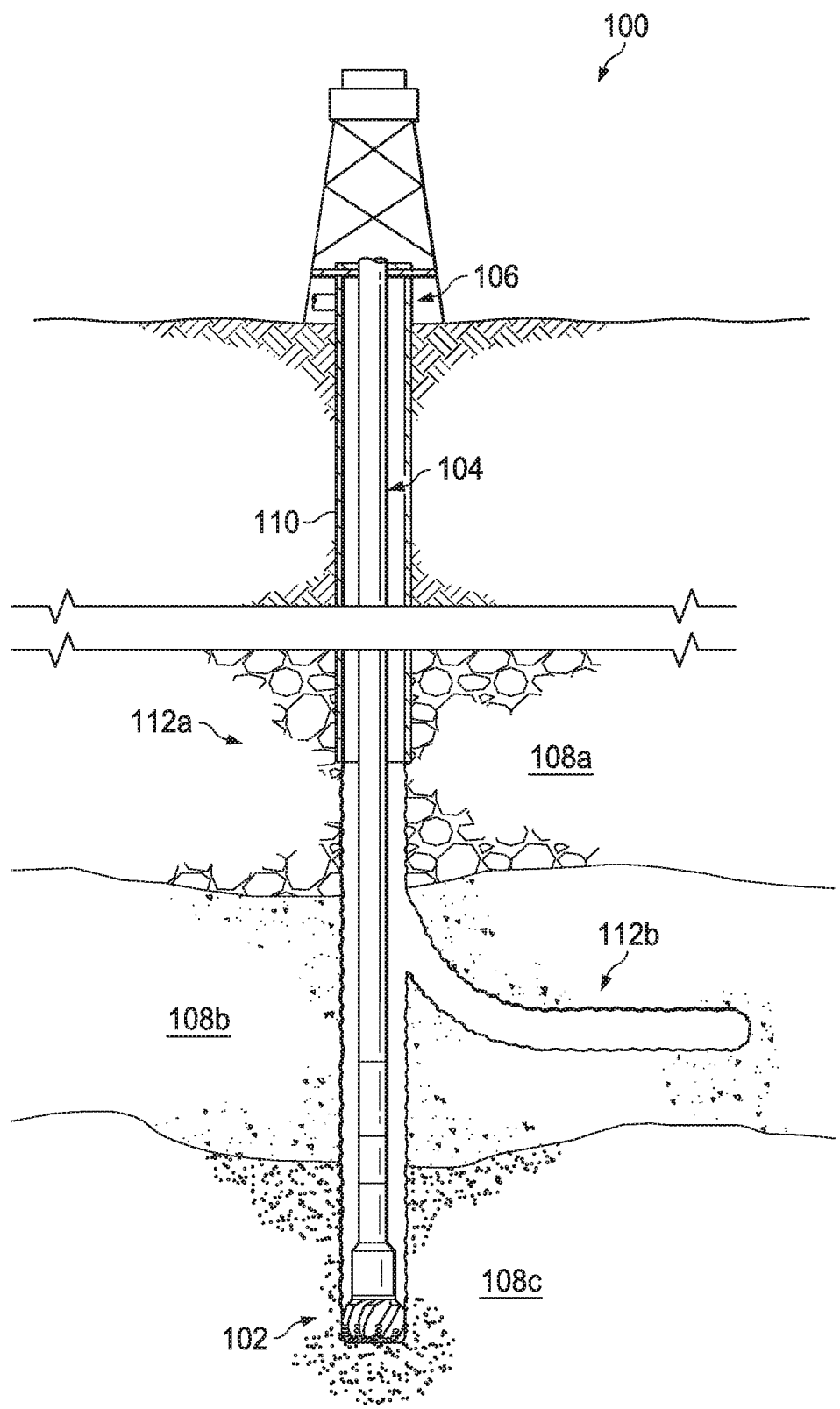
FIG. 1 is a side cross-sectional diagram of an example drilling, evaluation, and exploration system used in a wellbore drilled through geological formations.

FIG. 1 is a side cross-sectional diagram of an example drilling, evaluation, and exploration system 100 used in a wellbore drilled through geological formations. System 100 includes well surface 106. System 100 may also include drill string 104 associated with drill bit 102 that may be used to form a wide variety of wellbores such as generally vertical wellbore 112a or generally horizontal wellbore 112b or any combination thereof.

Wellbore 112 may be defined in part by casing string 110 that may extend from well surface 106 to a selected downhole location.

Drill bit 102 may be used to drill wellbore 112 through geological formations 108. Geological formations 108a, 108b, 108c, are illustrated. Wellbore 112 may extend through any number of geological formations. Different geological formations 108 may have different geological characteristics. For example, geological formation 108a may have a relatively low compressive strength, while geological formation 108c may have a relatively high compressive strength.

It may be desirable to gather information about the geological formations 108 before, during, and/or after drill bit 102 is used to drill through the geological formations 108. Geological formations 108 may contain layers of minerals with fluids in the interstitial space. In particular, it may be desirable to gather information about the intrinsic CO ratio of the geological formations 108 to determine if a hydrocarbon is present in a particular geological formation 108, or the hydrocarbon to water ratio of a geological formation 108. Such determinations may be used in determining placement and other properties of perforations in casing 110.

Such a determination may be made using available information about the CO ratios of minerals that make up geological formations, or of various hydrocarbons and water. Example CO ratios, along with chemical composition information is provided for illustrative minerals and fluids in Table 1.

TABLE 1

Chemical composition for illustrative minerals and fluids

| Material | Bulk density (g/cc) | Chemical formula | Carbon (wt %) | Oxygen (wt %) | C/O |
|---|---|---|---|---|---|
| Sandstone | 2.65 | SiO2 | 0 | 53 | 0 |
| Calcite | 2.71 | CaCO3 | 12 | 48 | 0.25 |
| Dolomite | 2.85 | MgCa(CO3)2 | 13 | 52 | 0.25 |
| Methane | 0.1–0.3 | CH4 | 75 | 0 | ∞ |
| Oil | 0.6–0.9 | CnH2n | 86 | 0 | ∞ |
| Fresh water | ~1.0 | H2O | 0 | 89 | 0 |

As Table 1 illustrates, there is a clear contrast in the chemical compositions of hydrocarbons and water. Hydrocarbons, such as methane and oil, are rich in carbon and comparatively low in oxygen. Water, in contrast, is high in oxygen and comparatively low in carbon. Various minerals commonly found in geologic formations have a CO ratio typically between that hydrocarbon or water. Table 2 presents the intrinsic CO ratios for typical hydrocarbon-containing geological formations.

TABLE 2

Intrinsic CO ratio values for typical hydrocarbon-containing geological formations

| Reservoir | Sw** (%) | Carbon (wt %) | Oxygen (wt %) | Intrinsic C/O Ratio |
|---|---|---|---|---|
| 30 pu* Sandstone | 15 | 10.29 | 44.36 | 0.232 |
| 30 pu Sandstone | 100 | 0 | 55 | 0.000 |
| 10 pu Sandstone | 0 | 0.76 | 64.15 | 0.012 |
| 35 pu Limestone | 15 | 23.5 | 37.41 | 0.628 |
| 35 pu Limestone | 100 | 12.04 | 49.39 | 0.244 |

*"pu" designates "porosity unit," which is the percentage of pore space in a unit bulk rock volume.
**"Sw" designates "total water saturation," which is the percentage of pore space occupied by water. The total water saturation may indicate the amount of hydrocarbon present in a geological formation because the total of water saturation, Sw, and the hydrocarbon saturation. So, should be equal to 1.

Figure 2:
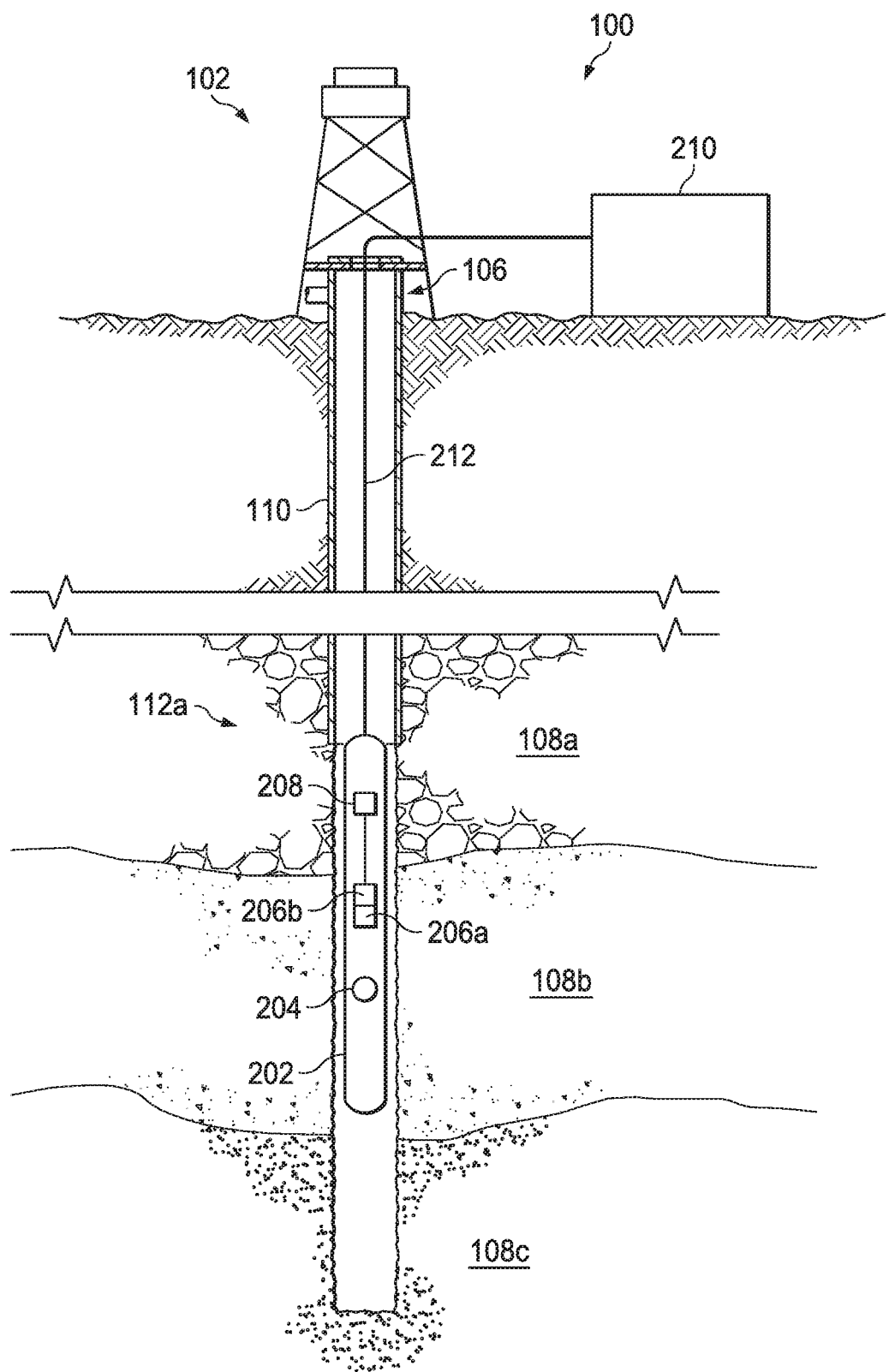
FIG. 2 is a side cross-sectional view of an example petrophysical tool system for measuring characteristics and/or composition of geological formations through which a wellbore is drilled.
Figure 4:
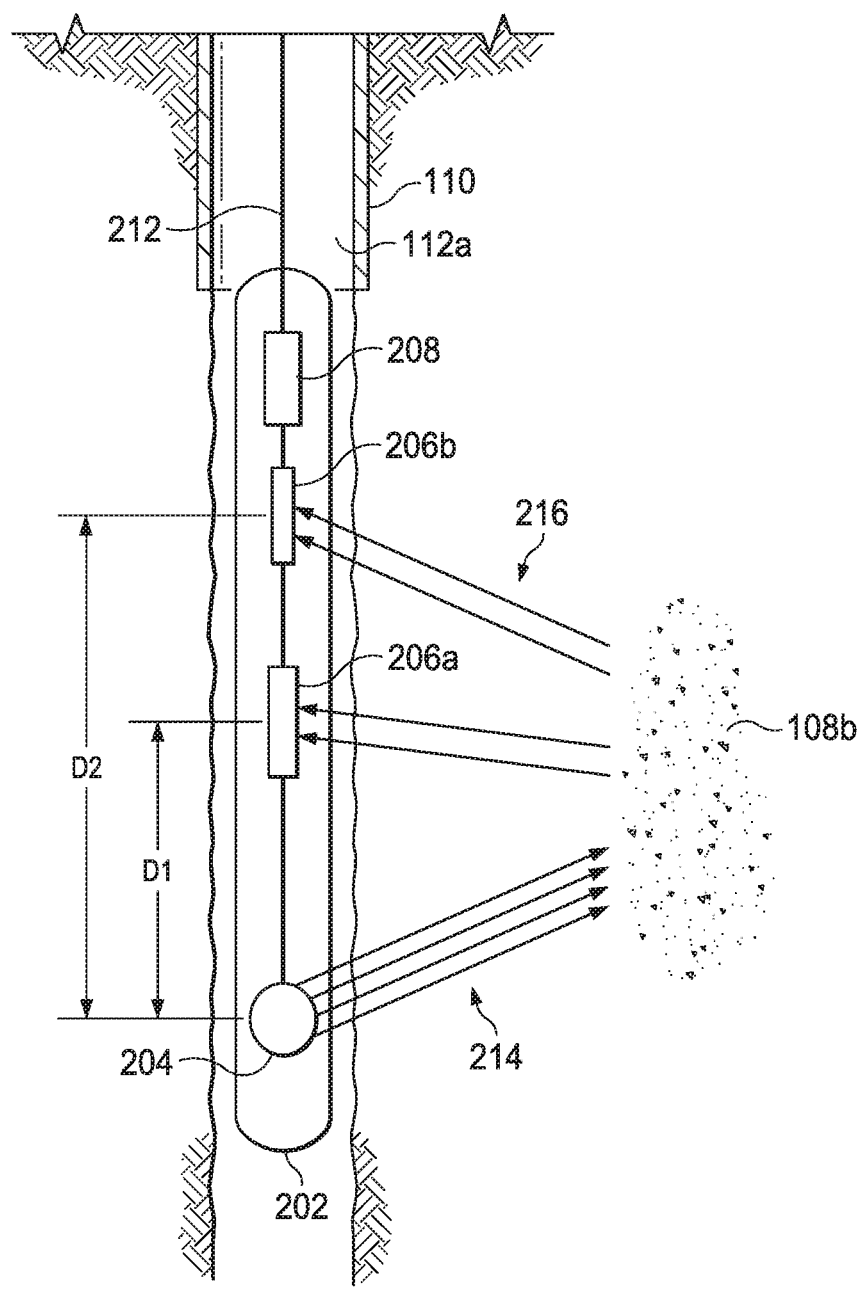
FIG. 4 is an enlarged side view of an example petrophysical tool for measuring characteristics and/or composition of geological formations through which a wellbore is drilled.

As shown in FIGS. 2 and 4, the system 100 also includes at least one petrophysical tool 202 downhole that measure properties of at least one of geological formations 208, such as geological formation 108b. The petrophysical tool 202 can be used inside of wellbore 112. The petrophysical tool 202 may include or otherwise be utilized in conjunction with any number of tools such as a nuclear magnetic resonance (NMR) tool, a nuclear neutron, such as a pulsed neutron tool, a density and natural gamma-ray tool, a resistivity tool, a seismic tool, a porosity tool, an induction logging tool and others. Such tools may be used in an open hole logging process prior to casing, a cased hole logging process and/or a logging-while-drilling (LWD) process.

The petrophysical tool 202 may be disposed in an uncased wellbore 112, i.e. "open hole" and/or in the wellbore 112 after a casing string 110 has been secured downhole, i.e. "cased hole." The petrophysical tool 202 may be disposed in the wellbore 112 prior to configuring the wellbore 112 for production or injection, for example prior to creating perforations in the casing string 110 and/or the wellbore 112. The location, size, and/or distribution of casing perforations may depend on the intrinsic CO ratio of the surrounding geological formation 108, such as at least one of geological formations 108a, 108b, and 108c, as determined using petrophysical tool 202 and a corrective algorithm, and the related determination of whether a hydrocarbon is present or the ratio of hydrocarbon to water in the surrounding geological formation 108.

The petrophysical tool 202 includes at least one gamma-ray detector 206. Gamma-ray detector 206 may include an enclosure that contains a crystal, such as an yttrium/gadolinium silicate scintillation crystal and a photomultiplier tube. As gamma-rays, such as gamma-rays 216 of FIG. 4, are incident upon/within the crystal, the gamma rays interact with the crystal and flashes of light are emitted. Each flash of light itself is indicative of an arrival of a gamma-ray, and the intensity of light is indicative of the energy of the gamma-ray. The flash of light is detected by the photomultiplier tube, which produces an output current that is proportional to the intensity of the light associated with each gamma-ray.

Gamma-rays can be used to identify the elements present in geological formation 108a because the nucleus of each atom has a particular energy level characteristic of the atom's element. When the nucleus of an atom emits a gamma-ray, the energy of the gamma-ray corresponds to the energy of the nucleus and thus to the atom's element.

As illustrated in FIGS. 2 and 4, the petrophysical tool 202 includes two gamma-ray detectors 206a and 206b. Any number of gamma-ray detectors 206 may be present.

As illustrated in FIGS. 2 and 4, petrophysical tool 202 is a pulsed neutron tool, and further includes at least one neutron source 204. Other petrophysical tools 202 that are not pulsed neutron tools may also include a neutron source 204. Neutron source 204 produces neutrons, such as neutrons 214 of FIG. 4. Neutron source 204 may produce neutrons from a fusion reaction. Neutron source 204 may emit neutrons having energy at or above 14 Mega-electron Volts (MeV). Petrophysical tool 202 may include more than one neutron source 204, although often one neutron source 204 is used.

The petrophysical tool 202 may include a shield between neutron source 204 and at least one gamma-ray detector 206.

The petrophysical tool 202 may also include downhole processing unit 208, which includes at least a processor and, optionally, also a memory.

Petrophysical tool 202 may be equipped with transmission equipment to communicate ultimately to a surface processing unit 210, which may include a processor and/or memory. Such transmission equipment may include wired, fiber optic, and wireless connections, and memory-based systems.

The petrophysical tool 202 is shown in FIGS. 2 and 4 as disposed in the wellbore 112 by a wireline cable 212, which may include transmission equipment. Petrophysical tool 202 may be disposed in wellbore 112 using other devices and methods such as slickline, coiled tubing, downhole tractor, etc. Some of these devices and methods can supply power, provide telemetry between the petrophysical tool 202 and the surface, or both.

Gamma-ray detector 206 detects gamma rays, which are a form of electromagnetic radiation. Gamma-ray detector 206 transmits a signal, such as current from its photomultiplier tube or a signal representative of the current, to downhole processing unit 208. The current or other signal is correlated to an energy spectrum of the detected gamma-ray(s) by the processor in downhole processing unit 208 or a processor in surface processing unit 210 and the spectrum and associated values are stored in a memory in downhole processing unit 208 or surface processing unit 210.

Figure 3:
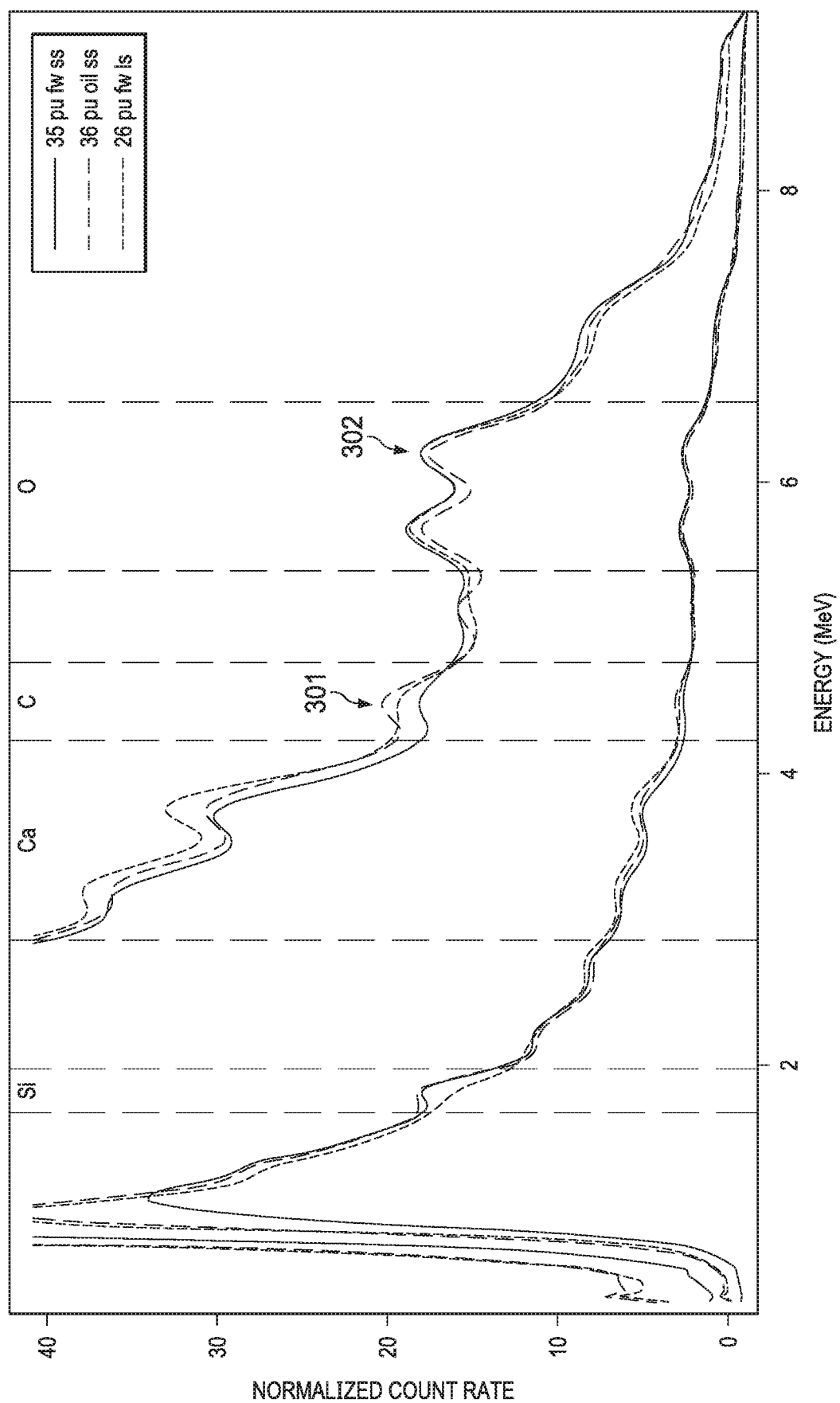
FIG. 3 is an example spectrum showing the characteristic gamma-ray peaks for certain chemical elements.

FIG. 3 shows an example gamma-ray spectrum with characteristic gamma-ray peaks for silicon, calcium, carbon, and oxygen. The spectrum is a plot of the normalized count rate (or just "count rate) of the gamma rays verses the energy level, measured in MeV. The spectrum detected by the gamma-ray detector 206 may have peaks centered around a particular energy level. The peaks in the spectrum at a particular energy level correspond to a measured atomic density of a particular element in the geological formation. In a properly calibrated petrophysical tool 202, the count rate of a particular element can be determined by determining the count rate level (measured from the Y-axis) of a peak at a known energy level. For example, the carbon level of the formation from a particular gamma-ray measurement is measured by reading the count rate of the peak located at 4.4 MeV (301). This peak located at 4.4 MeV is referred to as the carbon gamma-ray peak. Similarly, the oxygen level of the formation from a particular gamma-ray measurement is measured by reading the count rate of the peak located at 6.1 MeV (302). This peak located at 6.1 MeV is referred to as the oxygen gamma-ray peak.

Using either the processor in downhole processing unit 208 or in surface processing unit 210, or a combination thereof, the gamma-ray spectrum from multiple detected gamma-rays are analyzed collectively to output a measured count rate for the carbon gamma-ray peak (this measured count rate for carbon hereafter referred to as the "carbon gamma-ray peak") and a measured count rate for the oxygen gamma-ray peak (this measured count rate for carbon hereafter referred to as the "oxygen gamma-ray peak"). The carbon gamma-ray peak corresponds to the measured atomic density of carbon atoms in the geological formation and the oxygen gamma-ray peak corresponds to the measured atomic density of oxygen atoms in the geological formation. This analysis may involve identifying gamma-rays energy values within a certain variation, such as 1% or 2% total variation of the energy associated with carbon or oxygen atoms and allocating those gamma-rays energies to the carbon gamma-ray peak or oxygen gamma-ray peak, respectively to arrive at count rate for those peaks, in which the count rates are representative of the number of gamma-rays detected by detector 206 that are representative of carbon atoms and of oxygen atoms.

The processor in downhole processing unit 208 or the processor in surface processing unit 210, or both compares the value of the carbon gamma-ray peak to the value of the oxygen gamma-ray peak to arrive at a measured CO ratio, i.e. the calculated existing apparent CO ratio, then applies a corrective algorithm to the measured CO ratio to arrive at an intrinsic CO ratio for the geological formation 108b.

The processor in downhole processing unit 208 or the processor in surface processing unit 210, or both, may also use the intrinsic CO ratio to calculate whether hydrocarbon is present in geological formation 108b, the amount of hydrocarbon in geological formation 108b, the relative amounts of hydrocarbon and water in geological formation 108b, or any combinations thereof.

In either case, the processor in downhole processing unit 208 transmits data to the processor in surface processing unit 210 as needed and downhole processing unit 208 and surface processing unit 210 store data in memory of either or both units as needed.

Surface processing unit 210 includes at least one output device, such as a screen, monitor, printer, or wired or wireless transmitter that provides, with respect to geological formation 108b, the intrinsic CO ratio, an indication of whether hydrocarbon is present, the amount of hydrocarbon, or the relative amounts of hydrocarbon and water to a user in user-readable or user-understandable form.

As a non-limiting example, petrophysical tool 202 may be a pulsed neutron tool or a similar tool.

As illustrated in FIG. 4, the petrophysical tool 202 includes two gamma-ray detectors 206a and 206b. The first gamma-ray detector 206a is spaced a first distance (D1) from the pulsed neutron source 204. The first detector 206a detects gamma-rays emitted by the geological formation 108b as a result of irradiation with the neutrons emitted from the neutron source 204.

The second gamma-ray detector 206b is spaced a second distance (D2) from the pulsed neutron source 204. The second gamma-ray detector 206b is similar to the first gamma-ray detector 206a with respect to detecting gamma-rays emitted by the geological formation 108b. The second distance D2 is greater than the first distance D1. The first gamma-ray detector 206a, closest to the pulsed neutron source 204, may be referred to as a short spaced (SS) detector. The second gamma-ray detector 206b, furthest from the pulsed neutron source 204, may be referred to as an extra long spaced (XLS) detector. At least one additional gamma-ray detector (not shown), such as a long spaced (LS) detector, may be positioned between the SS detector and the XLS detector.

Petrophysical tools 202 exhibit errors in the carbon gamma-ray amount, the oxygen gamma-ray amount, the measured CO ratio, or any combination thereof. These errors tend to be the same for any particular petrophysical tool 202, or any particular type of petrophysical tool 202 sharing the same design (at least the same detectors 206 and, if present, neutron source 204, arranged at the same distances with the same shielding, if present). However, the errors tend to vary between different tools 202 or different types of petrophysical tools 202 with different designs. As a result of the error variation between petrophysical tools 202, when different petrophysical tools 202 are used to evaluate the same geological formation, different results may be obtained. In addition, due to the error, even if only a single petrophysical tool 202 is used, inaccurate information may be obtained. It is therefore useful to apply a correction algorithm, which may be specific to a petrophysical tool 202 or a type of petrophysical tool 202 having the same design, to arrive at the intrinsic CO ratio of a geological formation.

Corrective algorithms can be developed by repeatedly determining, using a petrophysical tool 202 or a single tool representative of a type of petrophysical tool 202, the measured CO ratio of a sample with a known amount of carbon and oxygen and, thus, a known intrinsic CO ratio. A mathematical model can be applied to the repeated determinations to locate patterns in errors and prepare corrective values. For example, a repeated random sampling statistical model, such as one employing a Monte Carlo statistical analysis, may be used.

Determinations can be repeated until the intrinsic CO ratio, as determined using the data from the petrophysical tool 202, is sufficiently close to the theoretical intrinsic CO ratio of the sample, or a reference CO ratio determined using another instrument or method.

The Monte Carlo statistical analysis or another mathematical analysis may include fitting a linear function, a non-linear function, or a polynomial function to a set of measured CO ratios as compared to known intrinsic CO ratios.

In one example using a pulsed neutron petrophysical tool 202, porosity of a sandstone sample was varied from 0 pu to 40 pu. In addition, pores were filled with water (Sw 100%), or with oil (Sw 0). Carbon gamma-ray peaks and oxygen gamma-ray peaks were used to determine measured CO ratios. Intrinsic CO ratios were calculated using the theoretical compositions of the sandstone, water, and oil. Results are presented in Table 3.

TABLE 3

Measured CO ratios and the intrinsic CO ratios for a sandstone reservoir

| Porosity (%) | Sw (%) | Carbon (wt %) | Oxygen (wt %) | Measured C/O Ratio | Intrinsic C/O Ratio (Theory) |
|---|---|---|---|---|---|
| 0 | 100 | 0 | 66.67 | 0.460 | 0.000 |
| 20 | 100 | 0 | 58.7 | 0.460 | 0.000 |
| 40 | 100 | 0 | 51.47 | 0.460 | 0.000 |
| 0 | 0 | 0 | 66.67 | 0.460 | 0.000 |
| 20 | 0 | 8.3 | 50.07 | 0.500 | 0.166 |
| 40 | 0 | 15.64 | 35.39 | 0.550 | 0.442 |

A Monte Carlo statistical analysis was applied to develop a corrective value to be applied to the measured CO ratio by a corrective algorithm to arrive at an intrinsic CO ratio.

Figure 5:
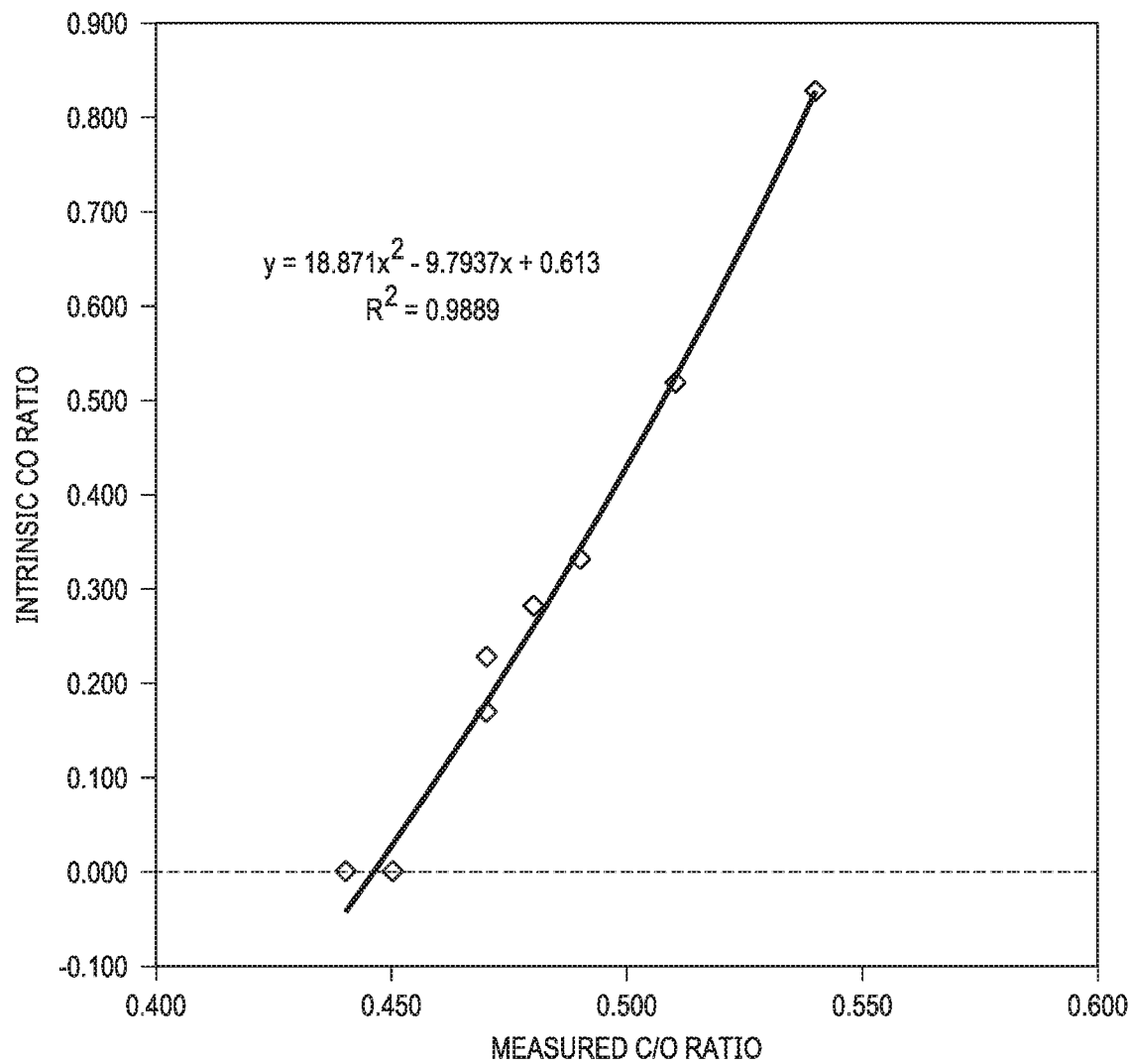
FIG. 5 is a graph comparing the measured CO ratios and the intrinsic CO ratios for a sandstone reservoir and a limestone reservoir; for given measured CO values, diamonds represent the true intrinsic values of the CO ratio; the line represents the intrinsic values of the CO ratio calculated using the indicated equation.

FIG. 5 is a graph that illustrates the measured CO ratios and the intrinsic CO ratios for the sandstone reservoir of Table 3 and a limestone reservoir. This graph shows a trend line demonstrating a correlation between the measured CO ratio and the intrinsic CO ratio. A corrective value for any measured CO ratio to be applied via a corrective algorithm to arrive at an intrinsic CO ratio may be selected from the trend line.

The corrective algorithm may apply a corrective value using a simple mathematical operation, such as addition or subtraction, or a first order equation. The corrective algorithm may also apply a corrective value using a complex mathematical operation, such as a second or higher order equation, a sequence of equations, or equations conditionally applicable based upon the measured CO ratio.

Figure 6:
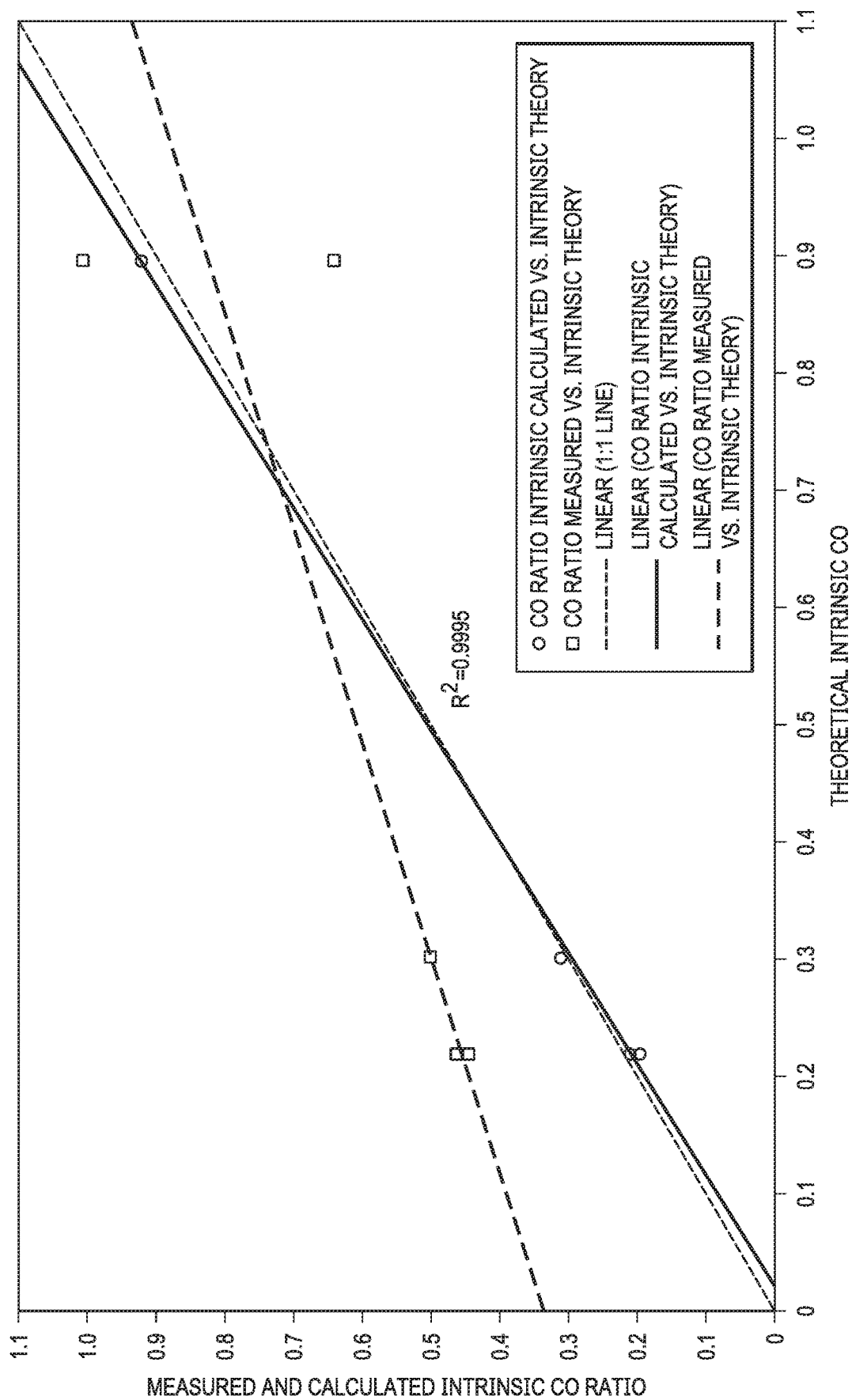
FIG. 6 is a graph comparing a calculated existing apparent CO ratio, i.e. a "measured CO ratio," and calculated intrinsic CO ratio versus the theoretical intrinsic CO ratio for a limestone formation; circles represent the calculated intrinsic CO ratio versus the theoretical intrinsic CO ratio; squares represent the existing apparent CO ratio versus theoretical intrinsic CO ratio; the solid line represents a 1:1 line; the thin hash line represents the linear best fit line of the calculated intrinsic CO ratio versus the theoretical intrinsic CO ratio; the thick hash line represents the linear best fit line of the existing apparent CO ratio versus theoretical intrinsic CO ratio.

FIG. 6 is a graph comparing calculated existing apparent CO ratio, i.e., a measured CO ratio, and calculated intrinsic CO ratio versus the theoretical intrinsic CO ratio for a limestone formation. This graph demonstrates that the calculated intrinsic CO ratio versus theoretical intrinsic CO ratio is approaching the 1:1 line, as evidence by the R-squared value of 0.9995. The data for FIG. 6 is shown below in Table 4:

TABLE 4

Comparison of calculated existing apparent CO ratio (measured CO ratio) and calculated intrinsic CO ratio versus the theoretical intrinsic CO ratio for a limestone formation

| | | | Limestone Formation | | CO Ratio | | |
|---|---|---|---|---|---|---|---|
| | Borehole | | Porosity | | Intrinsic | Intrinsic | |
| Case | Size | Fluid | (%) | Fluid | Theory | Calculated | Measured |
| 1 | 6" | Water | 13 | Fresh water | 0.302 | 0.31 | 0.501 |
| 2 | 6" | Water | 43 | Fresh water | 0.219 | 0.208 | 0.463 |
| 3 | 6" | Water | 43 | Oil | 0.895 | 0.921 | 0.641 |
| 4 | 8" | Water | 43 | Fresh water | 0.219 | 0.199 | 0.445 |
| 5 | 8" | Oil | 43 | Oil | 0.895 | 0.918 | 1.004 |

Figure 7:
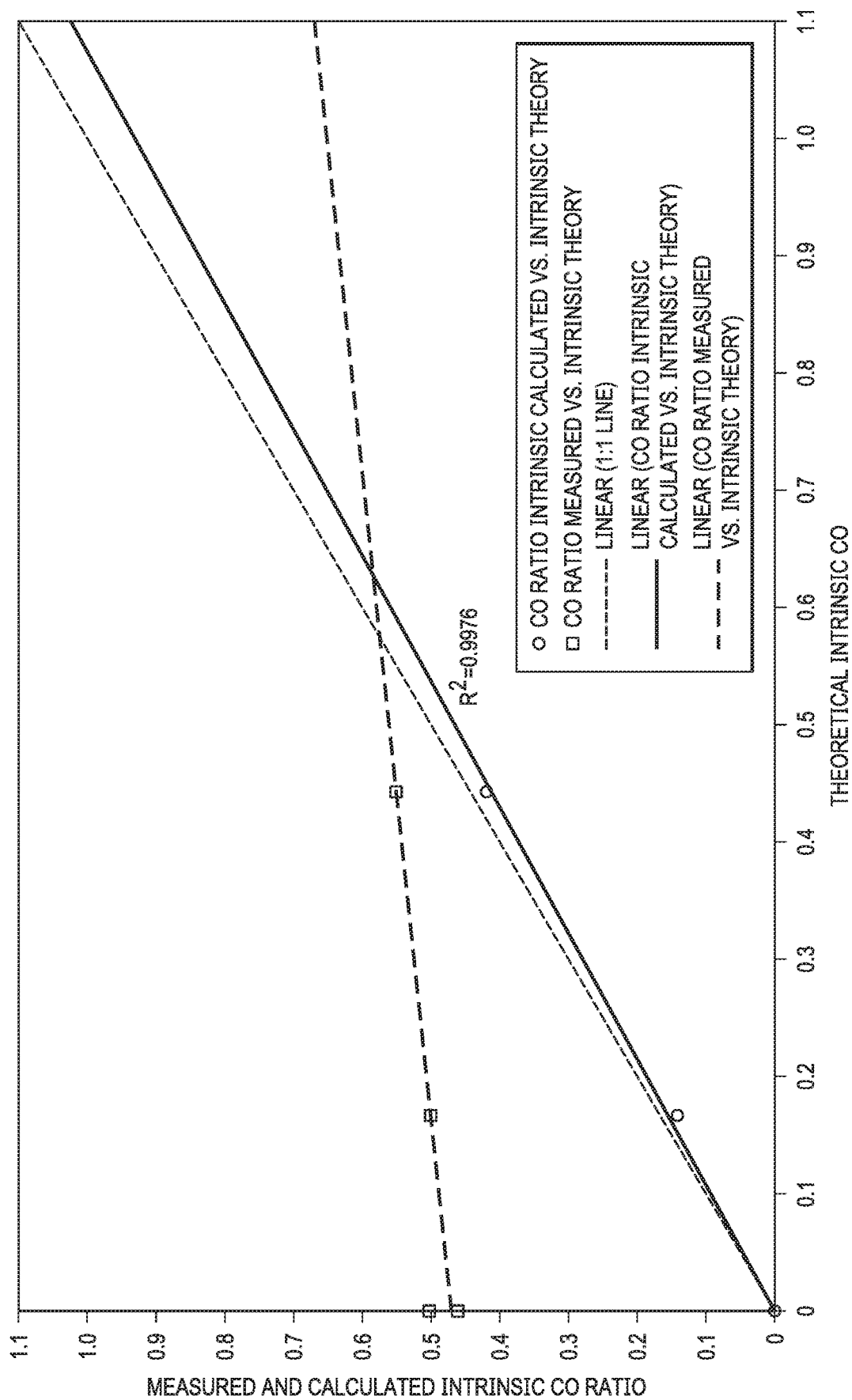
FIG. 7 is a graph comparing calculated existing apparent CO ratio, i.e. a "measured CO ratio," and calculated intrinsic CO ratio versus the theoretical intrinsic CO ratio for a sandstone formation; circles represent the calculated intrinsic CO ratio versus the theoretical intrinsic CO ratio; squares represent the existing apparent CO ratio versus theoretical intrinsic CO ratio; the solid line represents a 1:1 line; the thin hash line represents the linear best fit line of the calculated intrinsic CO ratio versus the theoretical intrinsic CO ratio; the thick hash line represents the linear best fit line of the existing apparent CO ratio versus theoretical intrinsic CO ratio.

FIG. 7 is a graph comparing calculated existing apparent CO ratio, i.e. a measured CO ratio, and calculated intrinsic CO ratio versus the theoretical intrinsic CO ratio for a sandstone formation. This graph demonstrates that the calculated intrinsic CO ratio versus theoretical intrinsic CO ratio is approaching the 1:1 line, as evidence by the R-squared value of −0.9976. The data for FIG. 7 is shown below in Table 5:

TABLE 5

Comparison of calculated existing apparent CO ratio (measured CO ratio) and calculated intrinsic CO ratio versus the theoretical intrinsic CO ratio for a sandstone formation

| | | | Sandstone Formation | | CO Ratio | | |
|---|---|---|---|---|---|---|---|
| | Borehole | | Porosity | | Intrinsic | Intrinsic | |
| Case | Size | Fluid | (%) | Fluid | Theory | Calculated | Measured |
| 1 | 6" | Water | 0 | Fresh water | 0 | 0.008 | 0.501 |
| 2 | 6" | Water | 20 | Fresh water | 0 | 0.008 | 0.46 |
| 3 | 6" | Water | 40 | Fresh water | 0 | 0.003 | 0.46 |
| 4 | 6" | Water | 0 | Oil | 0 | 0.008 | 0.46 |
| 5 | 6" | Water | 20 | Oil | 0.166 | 0142 | 0.5 |
| 6 | 6" | Water | 40 | Oil | 0.442 | 0.42 | 0.55 |

Figure 8:
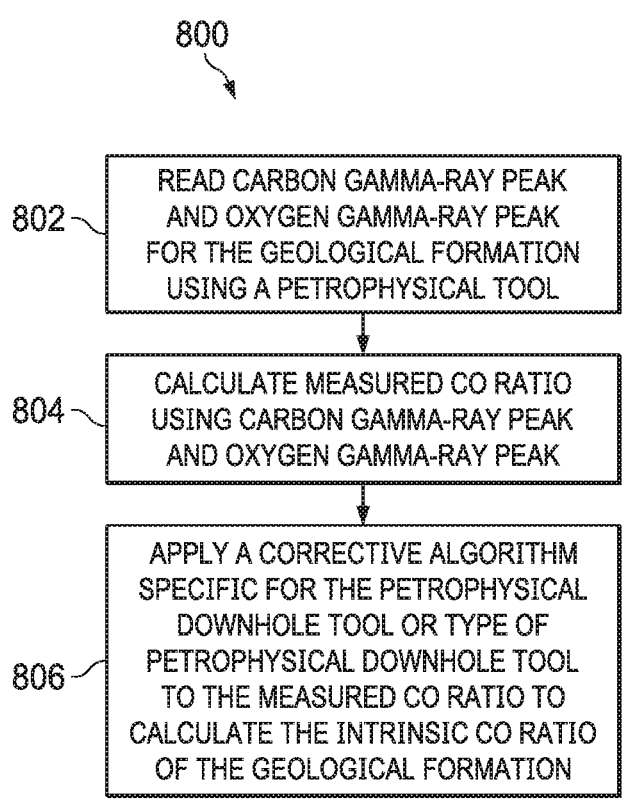
FIG. 8 is a flowchart of a method of determining the intrinsic CO ratio of a geological formation.

The disclosure further provides a method 800 of determining the intrinsic CO ratio of a geological formation. The method 800 may include the steps illustrated in FIG. 8 as well as any other steps described in the present specification, including those specifically described as implemented using a processor or a petrophysical tool. Furthermore, method 800 may be implemented in system 100 and/or using petrophysical tool 202.

In step 802 of method 800, a carbon gamma-ray peak for the formation and an oxygen gamma-ray peak for the geological formation are detected. These peaks may be detected using a petrophysical tool.

In step 804, a measured CO ratio of geological formation is determined using the carbon gamma-ray peak and the oxygen gamma-ray peak.

In step 806, a corrective algorithm is applied to correct the measured CO ratio to calculate an intrinsic CO ratio of the geological formation. The corrective algorithm may be specific for the petrophysical tool or the type of petrophysical tool. The corrective algorithm is derived by a mathematical analysis of the measured CO ratios of a sample with a known intrinsic CO ratio using the same petrophysical tool or a petrophysical tool representative of the type of petrophysical tool.

According to a first embodiment, A, the disclosure provides a method of detecting an intrinsic CO ratio in a geological formation by detecting, in a geological formation and using a petrophysical tool, a carbon gamma-ray peak for the geological formation and an oxygen gamma-ray peak for the geological formation; determining a measured CO ratio of the geological formation from the carbon gamma-ray peak and the oxygen gamma-ray peak; and correcting the measured CO ratio by applying a corrective algorithm specific for the petrophysical tool or the type of petrophysical tool to obtain an intrinsic CO ratio of the geological formation. The corrective algorithm is derived by a mathematical analysis of measured CO ratios of a sample with a known intrinsic CO ratio using the same petrophysical tool or a petrophysical tool representative of the type of petrophysical tool.

According to a second embodiment, B, the disclosure provides a method of forming casing perforations in a casing of a wellbore by detecting the intrinsic CO ratio in a geological formation using the method of embodiment A; assigning carbon in the intrinsic CO ratio as representative of hydrocarbon in the geological formation and oxygen in the intrinsic CO ratio as representative of water in the geological formation and calculating the hydrocarbon to water ratio for the geological formation based on the intrinsic CO ratio; and if the hydrocarbon to water ratio is greater than a set amount, forming at least one casing perforation in a casing of a wellbore adjacent the geological formation.

According to a third embodiment, C, the disclosure provides a drilling, evaluation, and exploration system used in a wellbore drilled through geological formations. The system includes a petrophysical tool including a processor, which may be included in the petrophysical tool or located in a surface processing unit, that detects in a geological formation and using the petrophysical tool, a carbon gamma-ray peak for the geological formation and an oxygen gamma-ray peak for the geological formation; determines a measured CO ratio of the geological formation from the carbon gamma-ray peak and the oxygen gamma-ray peak; corrects the measured CO ratio by applying a corrective algorithm specific for the petrophysical tool or the type of petrophysical tool to obtain an intrinsic CO ratio of the geological formation. The corrective algorithm is derived by a mathematical analysis of measured CO ratios of a sample with a known intrinsic CO ratio using the same petrophysical tool or a petrophysical tool representative of the type of petrophysical tool.

Embodiments A, B, and C may all be combined with one another and with the following additional embodiments, which may also be combined with one another in any manner unless clearly mutually exclusive:

i) the mathematical analysis may be a Monte Carlo statistical analysis;

ii) the Monte Carlo statistical analysis may include fitting a linear function to a set of measured CO ratios as compared to known intrinsic CO ratios;

iii) the Monte Carlo statistical analysis may include fitting a non-linear function to a set of measured CO ratios as compared to known intrinsic CO ratios; and iv) the Monte Carlo statistical analysis may include fitting a polynomial function to a set of measured CO ratios as compared to known intrinsic CO ratios.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of measuring an intrinsic carbon to oxygen (CO) ratio in a geological formation, the method comprising:
    disposing a petrophysical tool downhole, in a wellbore, proximate the geological formation, the petrophysical tool including at least one gamma-ray detector;
    using the petrophysical tool, reading a carbon gamma-ray peak for the geological formation and an oxygen gamma-ray peak for the geological formation;
    determining a measured CO ratio of the geological formation from the carbon gamma-ray peak and the oxygen gamma-ray peak; and
    correcting the measured CO ratio by applying a corrective algorithm specific for the petrophysical tool or the type of petrophysical tool to obtain an intrinsic CO ratio of the geological formation,
    wherein the intrinsic CO ratio of the geological formation is the ratio between atomic number density values of carbon and oxygen, and the corrective algorithm is derived by a mathematical analysis of measured CO ratios of a sample with a known intrinsic CO ratio using the same petrophysical tool or a petrophysical tool representative of a same type of petrophysical tool.

2. The method of claim 1, wherein the petrophysical tool is a pulsed neutron tool.

3. The method of claim 1, wherein the mathematical analysis is a Monte Carlo statistical analysis.

4. The method of claim 3, wherein the Monte Carlo statistical analysis comprises fitting a linear function to a set of measured CO ratios as compared to known intrinsic CO ratios.

5. The method of claim 3, wherein the Monte Carlo statistical analysis comprises fitting a non-linear function to a set of measured CO ratios as compared to known intrinsic CO ratios.

6. The method of claim 3, wherein the Monte Carlo statistical analysis comprises fitting a polynomial function to a set of measured CO ratios as compared to known intrinsic CO ratios.

7. A method of forming casing perforations in a casing of a wellbore, the method comprising:
    measuring an intrinsic carbon to oxygen (CO) ratio in a geological formation by:
        disposing a petrophysical tool downhole proximate the geological formation, the petrophysical tool including at least one gamma-ray detector;
        using the petrophysical tool, reading a carbon gamma-ray peak for the geological formation and an oxygen gamma-ray peak for the geological formation;

determining a measured CO ratio of the geological formation from the carbon gamma-ray peak and the oxygen gamma-ray peak;

correcting the measured CO ratio by applying a corrective algorithm specific for the petrophysical tool or the type of petrophysical tool to obtain an intrinsic CO ratio of the geological formation, wherein the intrinsic CO ratio of the geological formation is the ratio between atomic number density values of carbon and oxygen, and the corrective algorithm is derived by a mathematical analysis of measured CO ratios of a sample with a known intrinsic CO ratio using the same petrophysical tool or a petrophysical tool representative of a same type of petrophysical tool;

assigning carbon in the intrinsic CO ratio as representative of hydrocarbon in the geological formation and oxygen in the intrinsic CO ratio as representative of water in the geological formation and calculating the hydrocarbon to water ratio for the geological formation based on the intrinsic CO ratio; and when the hydrocarbon to water ratio is greater than a set amount, forming at least one casing perforation in a casing of a wellbore adjacent the geological formation.

8. The method of claim 7, wherein the petrophysical tool is a pulsed neutron tool.

9. The method of claim 7, further comprising forming a set of casing perforations whose location, size, and/or distribution are determined using the hydrocarbon to water ratio.

10. The method of claim 7, wherein the mathematical analysis is a Monte Carlo statistical analysis.

11. The method of claim 10, wherein the Monte Carlo statistical analysis comprises fitting a linear function to a set of measured CO ratios as compared to known intrinsic CO ratios.

12. The method of claim 10, wherein the Monte Carlo statistical analysis comprises fitting a non-linear function to a set of measured CO ratios as compared to known intrinsic CO ratios.

13. The method of claim 10, wherein the Monte Carlo statistical analysis comprises fitting a polynomial function to a set of measured CO ratios as compared to known intrinsic CO ratios.

14. A drilling, evaluation, and exploration system used in a wellbore drilled through geological formations, the system comprising:

a petrophysical tool disposed downhole, the petrophysical tool including at least one gamma-ray detector and one neutron source; and a processor, which may be included in the petrophysical tool or located in a surface processing unit, that using the petrophysical tool, reads a carbon gamma-ray peak for the geological formation and an oxygen gamma-ray peak for the geological formation;

determines a measured carbon to oxygen (CO) ratio of the geological formation from the carbon gamma-ray peak and the oxygen gamma-ray peak; and corrects the measured CO ratio by applying a corrective algorithm specific for the petrophysical tool or the type of petrophysical tool to obtain an intrinsic CO ratio of the geological formation, wherein the intrinsic CO ratio of the geological formation is the ratio between atomic number density values of carbon and oxygen, and the corrective algorithm is derived by a mathematical analysis of measured CO ratios of a sample with a known intrinsic CO ratio using the same petrophysical tool or a petrophysical tool representative of a same type of petrophysical tool.

15. The method of claim 14, wherein the petrophysical tool is a pulsed neutron tool.

16. The system of claim 14, wherein the mathematical analysis is a Monte Carlo statistical analysis.

17. The system of claim 16, wherein the Monte Carlo statistical analysis comprises fitting a linear function to a set of measured CO ratios as compared to known intrinsic CO ratios.

18. The system of claim 16, wherein the Monte Carlo statistical analysis comprises fitting a non-linear function to a set of measured CO ratios as compared to known intrinsic CO ratios.

19. The system of claim 16, wherein the Monte Carlo statistical analysis comprises fitting a polynomial function to a set of measured CO ratios as compared to known intrinsic CO ratios.

* * * * *